United States Patent
Serobian et al.

(10) Patent No.: US 9,080,076 B2
(45) Date of Patent: Jul. 14, 2015

(54) PRODUCT FOR TREATING VEHICLE SURFACES

(71) Applicant: THE ARMOR ALL/STP PRODUCTS COMPANY, Danbury, CT (US)

(72) Inventors: Ashot K. Serobian, Martinez, CA (US); Nicholas S. Norberg, San Ramon, CA (US)

(73) Assignee: THE ARMOR ALL/STP PRODUCTS COMPANY, Danbury, CT (US)

( * ) Notice: Subject to any disclaimer, the term of this patent is extended or adjusted under 35 U.S.C. 154(b) by 203 days.

(21) Appl. No.: 13/851,194

(22) Filed: Mar. 27, 2013

(65) Prior Publication Data

US 2013/0260068 A1    Oct. 3, 2013

Related U.S. Application Data

(60) Provisional application No. 61/617,602, filed on Mar. 29, 2012.

(51) Int. Cl.
*C09D 183/04* (2006.01)

(52) U.S. Cl.
CPC ......... *C09D 183/04* (2013.01); *Y10T 428/1352* (2015.01)

(58) Field of Classification Search
CPC ... C09D 7/12; C09D 183/04; Y10T 428/1352
USPC ............. 106/287.12; 428/35.7; 524/268, 266
See application file for complete search history.

(56) References Cited

U.S. PATENT DOCUMENTS

| 2005/0250668 A1 | 11/2005 | Serobian et al. |
| 2007/0277697 A1 | 12/2007 | Diamond et al. |
| 2008/0041272 A1 | 2/2008 | Tomasino et al. |
| 2009/0226740 A1 | 9/2009 | Teysseire |

OTHER PUBLICATIONS

International Preliminary Report on Patentability (IPRP) dated Mar. 20, 2014 from corresponding PCT/US2013/033976, pp. 4.
International Search Report and Written Opinion dated Jun. 5, 2013 from corresponding PCT/US2013/033976, pp. 11.

*Primary Examiner* — Michael C Miggins
(74) *Attorney, Agent, or Firm* — Ohlandt, Greely, Ruggiero & Perle, L.L.P.

(57) ABSTRACT

A product for treating vehicle surfaces, the product comprising: a) a high molecular weight silanol fluid in an amount from about 10 to about 80 weight percent, b) a catalyst in an amount from about 0.1 to about 15 weight percent, and c) at least one solvent. A kit for treating at least one surface of a vehicle, the kit comprising: a) a product comprising: i) a high molecular weight silanol fluid in an amount from about 10 to about 80 weight percent, ii) a catalyst in an amount from about 0.1 to about 15 weight percent, and iii) at least one solvent; and b) instructions for using the product, the instructions being enclosed with or on a container enclosing the kit, wherein the instructions for using the product include a curing step.

22 Claims, No Drawings

PRODUCT FOR TREATING VEHICLE SURFACES

RELATED APPLICATION

This application claims priority to U.S. Provisional Patent Application Ser. No. 61/617,602, filed Mar. 29, 2012, which is incorporated herein by reference in its entirety.

BACKGROUND

1. Field of the Disclosure

This disclosure relates to a product for treating the surfaces of vehicles comprising a silanol-containing composition used to enhance gloss and aid in protecting substrates. More particularly, a product for treating vehicles comprising silanols and catalysts that cure to form a durable, dry to the touch, coating when exposed to the moisture in air.

2. Discussion of the Background Art

Vehicle protectants are known in the art and are applied to the substrate desired to be "protected" such as a tire, car seat, dashboard, arm rest, etc. The protectant may be applied directly onto the surface to be treated, or may be first applied onto a cloth, pad, roller, sponge, or the like. As a result of this application, the substrate is enhanced, cleaned, and/or protected.

The use of automobile protective surface compositions are well known in the prior art and commercially demonstrated by the availability of various products sold under the trademarks SON-OF-A-GUN™ and ARMOR ALL™ (trademarks of the Armored Auto Group). The aforementioned products are well known as providing a silicone-oil based spray-on protectant to provide gloss (an aesthetic appearance property) and a protectant film to rubber polymer, and other surfaces. Representative of the well known use of such protectant products include use on automotive parts such as automobile tires, vinyl tops, vinyl dashboards, vinyl upholstery, rubber sealing strips, rubber and/or polymeric bumpers and the like, as well as usages in the home on synthetic rubbers, wood, painted surfaces, leather and the like.

Additionally, protectants have been designed specifically for use on tires. The tires of automobiles, bicycles and other vehicles collect dust, mud, etc. from the road to become soiled and unsightly. Moreover, as they are used for long periods of time, the tires lose their initial gloss and even if washed free of dirt, soil, etc., they will remain dull and lusterless. Illustrative tire treatment compositions and methods are disclosed, for example, in U.S. Patent Application Publication No. 2007/0277697 which discloses silanol-containing protectant compositions used to enhance gloss and aid in protecting substrates.

However, while the prior art treating agents impart good gloss and acceptable water repellency to tires, they can be stripped off by rain, car washing and wear over time requiring reapplication.

Additionally, treatments with silicone compositions typically impart a wet to the touch or "greasy" feel to the treated substrate. The wet or greasy surface can subsequently attract dirt or dust leaving the tire in need of additional cleaning and treatments. Also, conventional tire shines can cause "sling" where the silicone fluid on the tire is slung onto the side of the car through the rotation of the tires, causing greasy spots to appear. For at least the foregoing reasons, there is a need for a durable vehicle treatment product that cures dry to the touch.

The present disclosure also provides many additional advantages, which shall become apparent as described below.

SUMMARY OF THE DISCLOSURE

This disclosure relates in part to silanol-containing protectant compositions used to enhance gloss and aid in protecting substrates. More particularly, the present disclosure pertains to products for treating vehicles comprising silanols and catalysts that cure to a dry (e.g., non-greasy) finish.

The present disclosure is directed to a product that satisfies the needs and overcomes the disadvantages of the prior art. The present disclosure provides a composition, and method of use, which imparts an aesthetically pleasing appearance to substrates, particularly vehicle surfaces such as rubber, glass, vinyl, leather, plastic, cloth, metal, coated metal, or chrome. The shine or gloss of the treated substrate is enhanced, and cures dry to the touch to prevent sling, and improve durability. Additionally, the compositions of the present disclosure have a reduced degree of greasiness once dry. The compositions of the present disclosure help prevent cracking, fading, discoloration and premature aging of the tire and vinyl surfaces caused by ultra violet exposure, oxidation and ozone degradation.

This disclosure relates in part to a product for treating vehicle surfaces, the product comprising:

a) a high molecular weight silanol fluid in an amount from about 10 to about 80 weight percent, b) a catalyst in an amount from about 0.1 to about 15 weight percent, and c) at least one solvent.

The disclosure also relates in part to a kit for treating at least one surface of a vehicle, the kit comprising: a) a product comprising: i) a high molecular weight silanol fluid in an amount from about 10 to about 80 weight percent, ii) a catalyst in an amount from about 0.1 to about 15 weight percent, and iii) at least one solvent; and b) instructions for using the product, the instructions being enclosed with or on a container enclosing the kit, wherein the instructions for using the product include a curing step.

Further objects, features and advantages of the present disclosure will be understood by reference to the following drawings and detailed description.

DETAILED DESCRIPTION OF THE PREFERRED EMBODIMENT

It has now been surprisingly discovered that large molecular weight silanol end chain organopolysiloxane can be used together in a catalyzed reaction on vehicle surfaces to increase durability over traditional tire shine products, while maintaining a high gloss finish. Larger molecular weight silicone chains are less greasy and significantly improve durability, however, spreadability becomes difficult with increasing molecular weight. The introduction of reactive silicone-based chemistries provides an opportunity to exploit the benefits of high molecular weight silicone polymers while eliminating the need to manipulate large molecules on the surface of the tire. Additionally, reactive chemistries have been found to reduce the "greasy" feel of the finished product on the surface, and minimize or eliminate "sling" or loss of product due to the movement of a treated surface such as those on a vehicle, and surfaces such as those with a high amount of movement such as a vehicle tire.

As used herein, "moisture curable" means the catalyzed system is capable of hardening to a rigid or semi-rigid structure on exposure to moisture. Atmospheric moisture means the amount of moisture in the air, or relative humidity. Also, as used herein, "catalysts" include materials that exhibit not only catalytic properties but can also exhibit crosslinking properties. Notwithstanding the presence of a catalyst, the compositions of this disclosure can also contain a crosslinking agent as described herein. As used herein, "weight percent" is based without any dilution of the composition or ingredient, e.g., by a propellant in an aerosol.

It must be noted that, as used in this specification and the appended claims, the singular forms "a," "an" and "the" include plural referents unless the content clearly dictates otherwise. Thus, for example, reference to a "silanol" or a "crosslinking agent" includes two or more such ingredients.

Unless defined otherwise, all technical and scientific terms used herein have the same meaning as commonly understood by one of ordinary skill in the art to which the disclosure pertains. Although a number of methods and materials similar or equivalent to those described herein can be used in the practice of the present disclosure, the preferred materials and methods are described herein.

In the application, effective amounts are generally those amounts listed as the ranges or levels of ingredients in the descriptions, which follow hereto. Unless otherwise stated, amounts listed in percentage (%) are in weight percent based on 100% of the total composition.

Silanol Fluid

The compositions of the present disclosure contain silanol fluids such as silanol end-blocked polyorganosiloxane fluids, and have a viscosity of from about 1 to about 10,000,000 centipoise measured at 25° C. The silanol end-blocked polyorganosiloxanes useful in the compositions of the present disclosure are represented by the following:

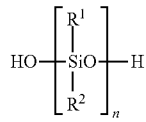

wherein $R^1$ and $R^2$ are independently selected from hydrogen, alkyl, alkenyl, aryl, and alkylaryl groups having 1 to 22 carbon atoms and organo-modified alkyl and aryl groups such as amino, epoxy, carboxy, or mercapto groups; and n is an integer from about 5 to about 15,000.

The silanol end-blocked polyorganosiloxanes employed in the practice of the present disclosure may vary from low viscosity fluids to viscous gums. Examples of silanol end-blocked polyorganosiloxanes useful in compositions of this disclosure include, but are not limited to, the following:

HOMe2SiO(Me2SiO)5SiMe2OH

HOMe2SiO(Me2SiO)15SiMe2OH

HOMe2SiO(Me2SiO)35SiMe2OH

HOMe2SiO(Me2SiO)283SiMe2OH

HOMe2SiO(Me2SiO)539SiMe2OH

HOMe2SiO(Me2SiO)3400SiMe2OH.

Additionally, the composition of the present disclosure may be comprised of more than one silanol fluid to take advantage of the range of properties attributed to various chain length silanol fluids. Low molecular weight silanol fluids for instance flow and are more easily applied to surfaces and generally have a better aesthetic look with a shiny, glossy finish. High molecular weight silanols are less greasy to the touch, are more durable, and are less likely to be removed from the surface. High molecular weight silanols by themselves, however, may be difficult to apply and manipulate on a vehicle surface. Silanol fluids such as those mentioned above are generally utilized at a concentration of 10 to 80 weight percent. Additional embodiments of the disclosure utilize a concentration of silanol fluids from about 20 to 40 weight percent.

Examples of high molecular weight silanol fluids useful in the present disclosure include but are not limited to silanol fluids with a viscosity above 500 cSt but below 10000 cSt. Higher molecular weight silanol fluids can also be used if formulated to the proper flow requirements of the particular product. Low molecular weight silanol fluids useful in the present disclosure include but are not limited to silanol fluids with a viscosity above 10 cSt but below 500 cSt.

Catalyst

The composition of the present disclosure includes a catalyst. Catalysts useful in the present disclosure include condensation reaction catalysts. More specifically, those that can facilitate a reaction when exposed to atmospheric moisture. In other words, it is strongly desired to develop a moisture curable composition which is excellent in storage stability in the sealed containers, i.e., capable of being stored under constant viscosity for a long period, rapidly curable in the presence of atmospheric moisture, and outstanding in mechanical strength after curing. The quick curing when exposed to the moisture in the air is a particular product benefit because it prevents sling, or loss of product due gravity or the movement of a treated surface such as a tire. The time required for the present compositions to cure depends upon ambient temperature, humidity, the reactivity of the groups in the presence of atmospheric moisture and the type of curing catalyst selected. Preferably, the present disclosure will cure under a variety of environmental conditions including conditions with higher and lower humidity, such but not limited to as about 0.5% to about 100% RH.

The product is moisture curable and cures on contact with moisture in the air in less than 60 minutes, preferable less than 20 minutes.

Examples of catalysts useful in the present disclosure include, metal carboxylates, metal oxides, alkyl metal carboxylates, alkyl metal alkoxides and metal chelates, including organic titanates and zirconates such as titanium and zirconium alkoxides and chelates. More specifically, tetraalkyl titanate, tetraalkyl zirconate, dibutyltindiacetate, dibutyltindilaurate, dibutyltin dioctoate, dibutyltin dimalate, stannous octoate, tin octylate, tetrabutyl titanate, dioctyltindilaurate and tetraisopropyltitanate are examples of catalysts that may be used. In one embodiment the catalyst titanium ethyl acetoacetate complex is used, which is available from Dorf Ketal, under the trademark TYZOR® IBAY. As described herein, the catalysts useful in this disclosure exhibit not only catalytic properties but can also exhibit crosslinking properties.

Solvents

The present disclosure includes at least one solvent to improve the coating properties of the composition. Such a solvent should have a boiling point in the range of from 35° C. to 300° C., be capable of dissolving silanol fluids, and be selected appropriately depending on the type and amount of solute used. Solvents useful in the present disclosure include liquid hydrocarbons and silicone solvents. Additionally, solvents useful in the present disclosure include toluene, xylene, naphthene, and other aromatic hydrocarbons; 2-pentanone, 4-methyl-2-pentanone, and other ketones; isoparaffin, paraffinic alkanes, normal paraffin and other aliphatic hydrocarbons; butyl acetate, isobutyl acetate, and other esters; hexamethyldisiloxane, octamethyltrisiloxane, decamethylcyclopentasiloxane, and other volatile silicones which may be used singly or as mixed solvents of two or more solvents. Volatility of a substance is determined when it meets the definition according to ASTM D 2369. This testing protocol measures the percentage weight loss after heating in an oven at 100° C. The amount of solvent is from 0 wt % to 99 wt %, and preferably from 30 wt % to 80 wt % relative to the total amount of the finished composition to balance the desired coating qualities with the appropriate viscosity for ease of application.

Additional Ingredients

Wetting Agent

Optionally, the present disclosure may include a wetting agent to enhance the ability of a composition to distribute or spread across a surface treated. Wetting agents useful in the present disclosure include silicone surfactants, organo-modified silicones, polydimethylsiloxane fluids, and silicone polyethers.

Examples of silicone surfactants useful in the present disclosure include, for example, nonionic silicone-glycol copolymers, such as those available from SILWET (Witco Specialties Group), including SILWET L-77 (silicone polyalkylene oxide-modified dimethyl polysiloxane) (CAS: 27306-78-1), SILWET L-7210, L-7220, and L-7230 (CAS: 68937-55-3) and as described in Adjuvants for Agrichemicals Ed. Foy, CRC Press (1992), and nonionic silicone polyethers, such as are available from Dow Corning (Midland, Mich.), such as Sylgard 309 (2-(3-hydroxypropyl) heptamethyltrisiloxane, ethoxylated, acetate).

Crosslinking Agent

The crosslinking agent is chosen to help increase the condensation reaction rate. A pure crosslinking agent without catalytic properties may not increase the reaction rate, but may be chosen to modify the properties of the cured product. As described herein, the catalyst used in this disclosure can exhibit crosslinking properties in addition to catalytic properties.

Optionally, the present disclosure may include a crosslinking agent. Representative organosilicon crosslinking agents which may be employed include vinylmethyldiacetoxysilane, ethyltriacetoxysilane, methyltriacetoxysilane, vinyltriacetoxysilane, silicon tetraacetate, methyltriethoxysilane, methyltrimethoxysilane, dimethyltetramethoxydisiloxane, tetraethoxysilane, tetramethoxysilane, tetrapropoxysilane, bis(n-methylbenzylamido)ethoxy-methylsilane, tris(cyclohexylamino)methylsilane, vinyl tris(isopropenoxy)silane, vinyltris(methylethylketoximine)silane, and methyltris(methylethylketoxime) silane. Additional crosslinking agents include phenyl functionalized silanes, methyl functionalized silanes, organic silicates such as tetraethyl orthosilicate, or combinations thereof. The crosslinking agent is present in an amount from about 0.1% to about 20% based on the total weight of the composition.

Additional Adjuncts

The composition of the present disclosure optionally contains one or more of the following adjuncts: stain and soil repellants, lubricants, odor control agents, perfumes, fragrances and thickeners. Other adjuncts include, but are not limited to, dyes and/or colorants, solubilizing materials, stabilizers, defoamers, preservatives, and other polymers. Thickeners, when used, include, but are not limited to, polyacrylic acid, metal oxides, silica oxide, $TiO_2$, metallic powders, and/or clays. Extra hydrophobicity may be obtained with silica oxide. Defoamers, when used, include, but are not limited to, silicones, aminosilicones, silicone blends, and/or silicone/hydrocarbon blends. The composition of this disclosure may also contain silicone fluids that offer additional gloss and protection.

Additionally, the composition may include ingredients or features that optimize the timing of the catalytic reaction. This is often necessary when conditions, such as humidity or temperature are variable, and speed up or slow the reaction making it more difficult to tailor to a specific use. Examples include but are not limited to coating or encapsulating the catalyst and cure accelerators. It may also be necessary to keep the catalyst and the curable composition from coming into contact with one another until cure is desired. One approach is to formulate a two-part system in which the catalyst is in one part and the curable composition is in another part. Two part systems may utilize divided packaging or other features that prevent the mixing of the catalyst with the curable compositions separate until the reaction is needed.

Furthermore, various additives and fillers normally added to vehicle treating materials can be appropriately added to the present composition. Specifically suggested are titanium oxide, ultramarine blue, Prussian blue, zinc white, rouge, chrome yellow, lead white, carbon black, transparent iron oxide, aluminum powder, and other inorganic pigments; azo pigments, triphenylmethane pigments, quinoline pigments, anthraquinone pigments, phthalocyanine pigments, and other organic pigments; rust preventives, UV absorbers, photostabilizers, anti-sagging agents, leveling agents, and other additives; quartz micropowder, calcium micropowder, fumed titanium dioxide, diatomaceous earth, aluminum hydroxide, microparticulate alumina, magnesia, zinc oxide, zinc carbonate and combinations of the above.

In an embodiment, the product contains a) a high molecular weight silanol fluid in an amount from about 10 to about 80 weight percent, preferably 15-25 weight percent; b) a catalyst, e.g., Tyzor® IBAY, in an amount from about 0.1 to about 15 weight percent, preferably 2 to 4 weight percent, and c) a solvent making up the balance. The solvent preferably is a primary solvent, e.g., Dow Corning D-245 solvent, in an amount of about 45 to about 75 weight percent and a secondary solvent, e.g., isopropyl alcohol, in an amount of about 5 to about 26 weight percent.

In a preferred embodiment, the product contains a) a high molecular weight silanol fluid in an amount from about 10 to about 25 weight percent; b) a diisobutoxy-bis ethylacetoacetato titanate catalyst, e.g., Tyzor® IBAY, in an amount from about 2 to 4 weight percent, c) a methyltrimethoxysilane crosslinker in an amount from about 4 to 8 weight percent, d) a polydimethylsiloxane in an amount from about 5 to 15 weight percent, and e) a decamethylcyclopentasiloxane solvent in an amount from about 40 to 65 weight percent.

Measurement/Testing

The measurement of drying, curing, or skin-over, is used to determine the amount of time it takes for a composition applied to a surface to reach a non-tacky state. Useful for determining dry, cure, or skin-over time are test protocols CTM 0095 from Dow Corning's corporate test method which uses polyethylene film contact to determine the non-tacky characteristic.

The compositions are spread ⅛+/−1/32 in. (0.32+/−0.08 cm) thick on a clean, smooth, non-porous surface and exposed to 77+/−2 F (25+/−1 C) and 50+/−4% RH. At intervals of 5 min or less a clean polyethylene strip is set on a fresh surface with a 1 oz (28.3 g) weight and left for 4+/−2 s before removing. The strip is then pulled straight up, from one end, and the time recorded when the strip pulls away cleanly from the sample. Visual inspections of the polyethylene strip determine whether the tested compositions are dry and thus pull away cleanly from the treated surface, or whether the tested compositions stick to the polyethylene strip and thus need additional drying time.

Areas of Use

The product can be used to treat vehicle surfaces such as inanimate, vehicle surfaces, including tires, dashboards, leather, windows, walls, and automobiles. Other surfaces include stainless steel, rubber, glass, vinyl, leather, plastic, cloth, metal, coated metal, and chrome. In particular, the present disclosure can be utilized to treat automotive tires that require quick drying to prevent sling and the desire for consumers to have a glossy finish. Additionally, the product can be applied to a vehicle surface by using a device such as a spray container, pourable container, aerosol container, squeeze container, pen, brush, sponge, roller, cloth, non-woven, moldable foam, syringe, power tool, power sprayer, and combinations thereof. The product can also be contained in a package that keeps the silanol fluid separate from the catalyst until use or immediately before use.

Various modifications and variations of this disclosure will be obvious to a worker skilled in the art and it is to be understood that such modifications and variations are to be included within the purview of this application and the spirit and scope of the claims.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. An aerosol product for treating vehicle surfaces, the aerosol product consisting essentially of:
   a) a high molecular weight silanol fluid in an amount from about 10 to about 80 weight percent,
   b) a catalyst in an amount from about 0.1 to about 15 weight percent, and
   c) at least one silicone solvent.

2. The aerosol product of claim 1 wherein the viscosity of the high molecular weight silanol fluid is between above about 500 to 25000 cSt.

3. The aerosol product of claim 1 wherein the product is moisture curable and cures on contact with moisture in the air in less than 60 minutes.

4. The aerosol product of claim 1 wherein the product is moisture curable and cures on contact with moisture in the air in less than 20 minutes.

5. The aerosol product of claim 1 further including at least one ingredient selected from the group consisting: of fragrances, thickeners, colorants, propellants, stabilizers, and combinations thereof.

6. The aerosol product of claim 1 wherein the vehicle surface is selected from a group consisting of rubber, glass, vinyl, leather, plastic, cloth, metal, coated metal, or chrome.

7. The aerosol product of claim 1 wherein the vehicle surface is a tire or exterior or interior plastic trim.

8. The aerosol product of claim 1 further including an application device.

9. The aerosol product of claim 1 wherein the viscosity is between about 10 to 25000 cSt.

10. The aerosol product of claim 1 wherein durability or shine or gloss of a substrate treated with the aerosol product is improved as compared to durability or shine or gloss of a substrate treated with a product containing a hydrocarbon solvent.

11. The aerosol product of claim 1 wherein durability or shine or gloss of a substrate treated with the aerosol product is improved as compared to durability or shine or gloss of a substrate treated with a product containing a hydrocarbon solvent and a wetting agent.

12. The aerosol product of claim 1 wherein durability or shine or gloss of a substrate treated with the aerosol product is improved as compared to durability or shine or gloss of a substrate treated with a non-aerosol product.

13. The aerosol product of claim 1 wherein sling reduction on a substrate treated with the aerosol product is improved as compared to sling reduction on a substrate treated with a non-aerosol product.

14. The aerosol product of claim 1 wherein the catalyst is selected from a group consisting of: metal carboxylates, alkyl metal carboxylates, alkyl metal oxides, organo metallics, and metal chelates, and combinations thereof.

15. The aerosol product of claim 14 further containing a silicone fluid, wherein the silicone fluid is polydimethylsiloxane, a crosslinking agent, wherein the crosslinking agent is trimethylmethoxysilane, the catalyst is diisobutoxy-bis ethylacetoacetato titanate, and the silanol fluid is hydroxy terminated polydimethylsiloxane.

16. The aerosol product of claim 1 wherein the silicone solvent is hexamethyldisiloxane, octamethyltrisiloxane, decamethylcyclopentasiloxane, or combinations thereof.

17. The aerosol product of claim 16 wherein the silicone solvent is decamethylcyclopentasiloxane.

18. The aerosol product of claim 1 further containing a wetting agent selected from the group consisting: of silicone surfactants, organo-modified silicones, polydimethylsiloxane fluids, and combinations thereof.

19. The aerosol product of claim 18 wherein the wetting agent contains a silicone polyether.

20. The aerosol product of claim 1 further containing a crosslinking agent selected from a group consisting of: silane monomers, silicates, short chain siloxanes, and combinations thereof.

21. The aerosol product of claim 20 wherein the crosslinking agent is a phenyl functionalized silane, methyl functionalized silane, or a mixture of phenyl functionalized silanes and methyl functionalized silanes.

22. A kit for treating at least one surface of a vehicle, the kit comprising: a) an aerosol product consisting essentially of: i) a high molecular weight silanol fluid in an amount from about 10 to about 80 weight percent, ii) a catalyst in an amount from about 0.1 to about 15 weight percent, and iii) at least one silicone solvent; and b) instructions for using the aerosol product, the instructions being enclosed with or on a container enclosing the kit, wherein the instructions for using the aerosol product include a curing step.

* * * * *